Patented Mar. 30, 1943

2,315,198

UNITED STATES PATENT OFFICE 2,315,198

HEAT RESISTIVE MATERIAL, ESPECIALLY BUILDING MATERIAL, AND METHOD OF MAKING SAME

Victor Moritz Goldschmidt, Smestad, near Oslo, and Kristoffer Johannes Stenvik, Oslo, Norway; vested in the Alien Property Custodian No Drawing. Application October 15, 1940, Serial No. 361,254. In Norway December 21, 1939

11 Claims. (Cl. 106—64)

There are known refractory materials, especially mortar, consisting substantially of substances rich in magnesium orthosilicate, preferably olivine rock, and which contain as bonding agents considerable amounts, for instance about 15–30 per cent by weight of mixtures between aluminous hydraulic cement and such substances as borates and silicates, which substances when heated to elevated temperatures, for instance 500–1400° C., are capable of forming viscous glasses or viscous glassy fusion products, jointly with, for instance quartz, oxides of calcium, magnesium, iron and the like, which glasses or fusion products do not to any substantial degree attack the material rich in magnesium orthosilicate.

Further it is known to calcine in advance materials rich in magnesium orthosilicate jointly with fluxing agents containing lime and magnesia or chromite, forming sintered forsterite masses, and afterwards to bond the comminuted sintered masses by means of aluminous hydraulic cement. Addition of comminuted crude olivine rock to such unfired refractory masses has been stated to be detrimental. The use of Portland cement as a bonding agent for unfired refractory masses from olivine rock has been stated to be impossible, for the reason that Portland cement will lose its bonding power through dehydration at intermediate temperatures, for instance 300–1100° C. Unfired refractory materials from magnesium orthosilicate, bonded with magnesium oxy-chloride cement (Sorel-cement) are strong after firing, but are comparatively weak at 800° C.

Efforts have also been made to make waterproof and refractory materials from mixtures of platy or fibrous magnesium hydrosilicates, such as talc, serpentine and amphibole, with cement; but these mixtures lose much of their strength, if the temperatures of dehydration of the hydrosilicates are surpassed, and at comparatively low temperatures they lose their consistency by melting wholly or in part.

The principal object of the present invention is to manufacture materials, especially all kinds of building materials, which are resistive to the r·tion of elevated temperatures within a large range, from ordinary temperature up to 1200–1400° C. or even 1500–1600° C., and to make these materials from such cheap raw materials and at such low costs of production that they can be used extensively for building purposes, wherever they will be required to resist all temperatures which have to be considered for fireproof vaults and staircases, chimneys, and for a large field of industrial furnaces and apparatus.

Extensive experiments have led to the surprising result that finely powdered mixtures of material rich in magnesium orthosilicate, such as for instance olivine rock (dunite) and calcareous hydraulic cements, such as Portland cement, by simple bonding with water can be transformed to building materials which not only have sufficient strength at ordinary temperatures, but which remain strong even if heated to any temperature between room temperature and about 1300° C., and which even can become stronger during heating and which can attain a considerable degree of refractoriness.

The melting temperatures of these mixtures are surprisingly high; for instance from 92 per cent of crude olivine rock and 8 per cent by weight of Portland cement here can be made building materials which remain substantially solid even at 1580° C. and which at 1450° C. can bear a load of 2 kg./cm$^2$. Contrary to that behaviour, mixtures of 92 per cent olivine rock and 8 per cent aluminous hydraulic cement (calcium aluminate cement) collapse completely by melting at 1430° C.

The invention can be used for making different kinds of building materials, such as for instance mortar, ramming masses, shaped products such as bricks, tubes, monolithical objects, fire-proof vaults, staircases and other parts of buildings, linings of furnaces, boiler furnaces, chimneys, flues and the like.

It is not necessary to add substances which are comparatively expensive and which are apt to form glasses, such as for instance borates. Also it is not necessary to calcine in advance the magnesium orthosilicate materials in presence of fluxing agents containing lime or chromium oxide. A further advantage of the present invention is the use of cement rich in lime, for instance ordinary Portland cement, which can be used with advantage instead of aluminous hydraulic cement, because the cost of Portland cement is much less and because the treatment, the hydration and the drying of Portland cement are by far more simple than in the case of aluminous cement. Very great advantage of the use of Portland cement as compared with the same amount of aluminous cements is the reduction of the percentage of alumina, as that constituent decidedly lowers the melting temperature of the magnesium silicate masses.

As a raw material for the present invention crude olivine rock, especially dunites poor in iron, can be used with advantage.

The proportion between the magnesium orthosilicate material and the cement should be such that the magnesium silicates are present in excess over the cement. Usually the amount of cement in the dry mixture should not exceed about 25 per cent by weight, preferably it should not exceed 20 per cent by weight. In most cases by simple bonding with water and drying, building materials, for instance shaped bodies can be made by using 5-15, preferably 7-12 per cent by weight of cement rich in lime, such as Portland cement. These building materials are characterized by very good resistiveness to heat. In some cases useful products can be made with even as low as about 2-5 per cent of cement, especially if the shaping is effected by means of hydraulic pressure.

According to the purpose of use, the material rich in magnesium orthosilicate can be used either wholly or in part as a finely subdivided powder. If the building material is to be used as a mortar, preferably the whole material is comminuted to a powder. If the material is to serve as a ramming mass, or for making shaped bodies, part of the material rich in magnesium orthosilicate may be in a finely powdered state of subdivision, and the remaining part in granular state, for instance finely to coarsely granular, or also as lumps, or in some cases in part granular and in part in the state of lumps. But in any case at least part of the material rich in magnesium orthosilicate should be present in the state of powder, with particles less than 0.5 mm., preferably less than 0.2 to 0.1 mm.

In order to increase the refractoriness of the products there can be added to the mixture of material rich in magnesium orthosilicate and cement, additional refractory substances, such as chromite ore, magnesium oxide and the like.

If shaped bodies are to be made, for instance bricks, it is advisable to confine the addition of water to that minimum amount which is necessary for the full bonding by hydration of the hydraulic cement which is present in the mixture. Thus there can be obtained products of comparatively low porosity.

For making products having as low a porosity as possible it is also advisable to make such a grading of grain sizes, that as dense a texture as possible is attained, and to effect the shaping by means of high pressure, for instance by hydraulic pressure up to about 1000 kg./cm.$^2$. Further it has been found to be advantageous to use mechanical vibration in order to make the batch fill the moulds as densely as possible.

In cases in which concrete-like masses have to be emplaced in a semi-liquid state, for instance into casings, the amount of water ought to be somewhat larger and can be regulated in similar manner as in the making of ordinary concrete.

For making porous products, for instance for the purpose of thermal insulation, a purpose for which the material is very well suited, the same raw materials can be used, especially as finely powdered mixtures, by employing practices which are well known to those experienced in the art, such as froth making, making of gas bubbles, incorporation of volatile or combustible substances in the solid state, and elimination of these solid substances by means of heating or combustion. When porous materials are manufactured from mixtures of substances rich in magnesium orthosilicate and cement, larger amounts of water have to be used than are necessary merely for the bonding by hydration of the cement rich in lime.

The moulded products are subjected to a process of bonding and drying such as is usual in the making of cement and concrete products. In many cases it has been found advantageous subsequent to the bonding at ordinary temperature, which may be made in humidity conditioned air, to employ a second drying step at elevated temperature, for instance at 140°-200° C. This interval, however, is mentioned only as an example, not as a limitation. For certain uses, for instance in the making of porous products by combustion of combustible fillers, the products can be subjected to firing, and in such cases firing at comparatively low temperatures is usually sufficient, for instance in ordinary brick-making furnaces at 1000-1200° C.

According to the present invention valuable heat-resisting, fireproof, and even refractory materials, especially building materials, can be made starting from the cheapest raw materials, such as crude olivine rock and comparatively small amounts of Portland cement.

With regard to a convenient selection of raw materials it may be mentioned that dunites which are rich in olivine, rich in magnesium, preferably poor in iron, can be used as well as olivine rocks which besides olivine contain also other magnesium silicates, especially also rocks of the series dunite-enstatite rock, even if the resistiveness to heat is best in products, which are made from the purest dunites, poor in iron, containing about 46-51% MgO and about 6-10% FeO. If the resistiveness to heat need not exceed a temperature about 1400° C., rather impure olivine rocks and mixtures of minerals, for instance waste products from the production of highly refractory olivine can be used. Sand and debris rich in olivine can also be used.

The best results, with regard to the mechanical strength of the products, are obtained if at least 10 per cent by weight, preferably 15-20 per cent by weight, of the dunite is finely milled to a particle size less than 0.1 mm.

With regard to the types of calcareous cements which can be used, experiments have demonstrated that very good results can be attained with cement which dominatingly consists of calcium silicates, such as Portland cement containing about 67% CaO and about 22% SiO$_2$. The percentage of aluminium oxide in the cement ought to be low, in order to give products which are most resistive to heat, that is less than 10%, preferably less than 7% Al$_2$O$_3$; but cement with a larger percentage of Al$_2$O$_3$, such as cements containing large amounts of calcium aluminate or calcium aluminate-ferrite can also be used if there are no specially strong demands with regard to heat resistiveness of the products. The cement always has to be used finely milled to the customary fineness of cement.

*Examples*

1. Olivine rock of the composition 42.0% SiO$_2$, 48.4% MgO, 0.5% Al$_2$O$_3$, 6.2% FeO, 0.5% Fe$_2$O$_3$, 0.3% Cr$_2$O$_3$, 0.2% CaO, 0.4% NiO, 1.2% H$_2$O, is comminuted in such a manner that the entire material passes through a screen with apertures of 0.1 mm. diameter. To 85 parts by weight of this material there is added 15 parts by weight of Portland cement of the composition: 67% CaO, 22% SiO$_2$, 6% Al$_2$O$_3$, 3% Fe$_2$O$_3$, 2% MgO. The two materials are mixed and are moistened with 7 parts by weight of water to 100 parts by weight of dry substance, are then moulded to bricks under a hydraulic pressure of 270 kg./cm.$^2$, and finally are dried at 20° C. for 7 days. After that the compressive cold crushing strength of the material is 220 kg./cm.$^2$, after heating to 500° C., for 17 hours it is 510 kg./cm.$^2$, after further heating for 6 hours to 800° C. it is 260 kg./cm.$^2$, and after still further heating for 9 hours to 1100° C. it is 300 kg./cm.$^2$.

2. The same olivine rock and the same cement are used as in Example 1. The olivine rock is comminuted to the following grades: 60 parts by weight have grain sizes between 0.5 mm. and 4.0 mm., 32 parts by weight have grain sizes below 0.1 mm. To this is added 8 parts by weight of Portland cement, and during thorough mixing 5 parts by weight of water are added. The batch is moulded under a hydraulic pressure of 270 kg./cm.$^2$, it is dried at first for 7 days at about 15° C., afterwards for 24 hours at 140° C. The compressive cold crushing strength of the material is about 200 kg./cm.$^2$. The material can be heated to 1580° C., without losing its consistency.

3. The same olivine rock and the same cement are used as in Example 1. The olivine rock is comminuted to the following grades: 60 parts by weight have grain sizes between 0.5 and 4.0 mm., 22 parts by weight are dry milled in a ball mill to a maximum size of 0.1 mm., 11 parts by weight are wet milled in a ball mill with 6 parts by weight of water to particle sizes less than 0.08 mm. The material with grain sizes 0.5-4.0 mm. is moistened with 1 part by weight of water, than the dry and the wet fine material are added together with 7 parts by weight of Portland cement. The material is rammed into moulds and dried.

4. Porous bricks are made from the same batch as in Example 1, by adding 100 parts by weight of powdered coke, poor in ashes, with grain sizes not in excess of 1 mm. to 85 parts by weight of finely milled olivine rock and 15 parts by weight of Portland cement, moistening with an amount of water sufficient to plastify the batch, moulding the batch, drying and firing in an oxidizing atmosphere at 1000° C. in order to make the mass porous by combustion of the coke. The product is suitable as a heat-resisting insulating material, for use in industrial furnaces such as forging or annealing furnaces.

5. The same olivine rock and the same Portland cement are used as in Example 1. 60 parts by weight of olivine with grain sizes 0.3-2 mm., 22 parts by weight of olivine with grain sizes less than 0.1 mm., 10 parts by weight of sintered magnesite, with 92% MgO, 3% Fe$_2$O$_3$, 3% SiO$_2$, 2% ignition loss, and with a grain size less than 0.2 mm., and 8 parts by weight of Portland cement, are mixed together with 5 parts by weight of water. The material is moulded in a hydraulic press under a pressure of 1000 kg./cm.$^2$, is dried for 8 days and is used for building furnaces to be used at temperatures up to 1620° C.

6. For making a refractory concrete mass for the bottom of an annealing furnace there is used an olivine rock and a Portland cement such as described in Example 1. By crushing the olivine rock and milling the finest part of the material, the various grain sizes can be produced. For the mixture the following proportions are employed: Of the olivine rock 280 kg. of grain size 15-30 mm., 180 kg. of grain size 7-15 mm., 200 kg. of grain size 0.1-2 mm., 200 kg. less than 0.1 mm. grain size, of the cement 140 kg. and of water 75 cubic decimeters (litres) are used. For the moulding there is used an electrically operated vibrator in order to increase the density of the concrete.

We claim:

1. A refractory comprising a mixture of a material rich in magnesium orthosilicate, and Portland cement, said material being in excess of said cement.

2. A refractory comprising a mixture of a material rich in magnesium orthosilicate and at least part of which is in finely divided form, and Portland cement, said cement constituting not less than about 2 and not more than about 20 per cent by weight of the refractory.

3. A refractory according to claim 2, said cement constituting from about 5 to about 15 per cent by weight of the refractory.

4. A refractory article comprising a mixture of a major proportion of a material rich in magnesium orthosilicate at least about 15 per cent of which is in the form of particles less than 0.1 mm. size, and Portland cement in an amount between 2 and 20 per cent of the entire refractory.

5. That method of making refractory articles which comprises forming a batch comprising a major proportion of material rich in magnesium orthosilicate, a minor proportion of Portland cement, and water in an amount at least sufficient to hydrate said cement, forming shapes from said batch, and drying said shapes.

6. A method according to claim 5, the amount of said water being in excess of that needed for hydrating said cement.

7. A method according to claim 5, part of said magnesium orthosilicate material being in the form of particles less than 0.1 mm. size, and said cement constituting from about 5 to about 15 per cent by weight of the dry constituents of the batch.

8. A method according to claim 5, said shapes being fired after drying.

9. A method according to claim 5 in which gas bubbles are incorporated in the batch.

10. A method according to claim 5 in which a minor proportion of combustible material is incorporated in the batch.

11. A method according to claim 5 in which a minor proportion of combustible material is incorporated in the batch, and the shapes are fired after drying.

VICTOR MORITZ GOLDSCHMIDT.
KRISTOFFER JOHANNES STENVIK.